United States Patent [19]

Loshaek et al.

[11] Patent Number: 4,549,794
[45] Date of Patent: Oct. 29, 1985

[54] HYDROPHILIC BIFOCAL CONTACT LENS

[75] Inventors: Samuel Loshaek, Chicago; Malcolm G. Townsley, Park Ridge, both of Ill.

[73] Assignee: Schering Corporation, Kenilworth, N.J.

[21] Appl. No.: 491,638

[22] Filed: May 5, 1983

[51] Int. Cl.⁴ .......................... G02C 7/04; G02C 7/06
[52] U.S. Cl. ............................... 351/161; 351/160 H
[58] Field of Search ................ 351/160 R, 160 H, 161

[56] References Cited

U.S. PATENT DOCUMENTS

| | | | |
|---|---|---|---|
| 3,031,927 | 5/1962 | Wesley | 351/160 R |
| 4,199,231 | 4/1980 | Evans | 351/160 R |
| 4,202,848 | 5/1980 | Neefe | 264/1 |
| 4,318,595 | 3/1982 | van der Kolk et al. | 351/160 R |
| 4,324,461 | 4/1982 | Salvatori | 351/160 H |

FOREIGN PATENT DOCUMENTS

| | | | |
|---|---|---|---|
| 62178 | 10/1982 | European Pat. Off. | 351/160 H |
| 2031178 | 4/1980 | United Kingdom | 351/160 H |
| 2033101 | 5/1980 | United Kingdom | 351/161 |

OTHER PUBLICATIONS

"New! Durasoft ® Bifocal", advertisement for Wesley-Jessen Inc., Chicago, Ill. 60603, Fall 1981.
Mandell, *The Optometric Weekley*, "A No Jump Bifocal Contact Lens", Jun. 1, 1967, pp. 19–21.

Primary Examiner—John K. Corbin
Assistant Examiner—Scott J. Sugarman
Attorney, Agent, or Firm—Warrick E. Lee, Jr.; Serle I. Mosoff

[57] ABSTRACT

Hydrophilic bifocal corneal contact lenses of the alternating-vision type having a critical set of dimensions for the various elements which results in a surprising increase in the success rate of persons wearing these improved lenses.

3 Claims, 2 Drawing Figures

HYDROPHILIC BIFOCAL CONTACT LENS

The present invention provides a bifocal corneal contact lens that may be worn successfully by a much higher percentage of patients than those of the prior art.

As a person ages, his ability to vary the focusing power of the natural lens of the eye diminishes. In the optical profession this is termed a loss of accommodation. At about age 40 the loss of accommodation commonly reaches a point where a refractive correction for reading or other near-vision work is required. If the person also requires a refractive correction for distant vision, then two different corrections are required. For patients wearing spectacles, bifocal lenses are provided wherein the distant-vision correction is built into the top portion of each spectacle lens and the reading correction, having higher plus power than the distant-vision correction, is built in to the lower portion. To gaze at objects in the distance, the patient looks straight-ahead with respect to his face, through the distant-vision portion of the lenses. To see objects that are close, the patient looks downward through the reading portion of the lenses. Bifocal spectacles based on this alternating-vision principle have been in successful use for many years.

Prior-art bifocal contact lenses have not been very successful. Contact lens bifocals made of hard material are difficult to make. Moreover, it is difficult to control the lens position, i.e. the patient cannot switch from looking through the reading segment to the distant-vision segment at will, and vice versa. Some prior art bifocal contact lenses made of hydrophilic material are based on a concentric design which attempts, rather unsuccessfully, to provide simultaneous distance and near-vision. In the one known commercial hydrophilic bifocal design based on the alternating-vision principle, the patient encounters great difficulty controlling the position of the lens with respect to his pupil, resulting in blurred vision.

SUMMARY OF THE INVENTION

We have now discovered hydrophilic bifocal corneal contact lenses of the alternating-vision type having a critical set of dimensions for the various elements which results in a surprising increase in the success rate of persons wearing these improved lenses.

Our invention is a hydrophilic bifocal corneal contact lens comprising a concave rear surface and a convex front surface, said lens in frontal projection comprising:
 (a) a perimeter in the form of a truncated circle having a diameter of 14 to 15 mm, said truncation forming the bottom of said lens and having a height greater than 1 mm,
 (b) a reading segment above the truncation having an upper boundary below the center of said truncated circle, the distance from said center to said upper boundary along a line bisecting the lens being from 1.5 to 3.5 mm, and
 (c) a distant-vision segment located such that the center of said truncated circle is within said distant-vision segment;
whereby when said lens is worn by a patient the distant-vision segment covers at least 70 percent of the patient's pupil when the patient looks straight ahead.

The present invention involves the discovery of a critical set of dimensions for alternating-vision bifocal contact lenses. Our lens yields the following visual results for a high percentage of patients fitted:
 (1) When the patient looks straight ahead, the distance portion of the lens moves into a position such that at least 70% and often 90%–100% of the pupil is covered by the distance portion, and
 (2) When the patient looks down, the lens translates upwards with respect to the pupil so that the axis of vision is through the reading segment. These two conditions are met in the lens of this invention and the wearer is able to translate from distance to near vision at will.

One critical dimension for the subject lens is that the diameter be at least 14 mm and preferably about 14.5 mm. We have unexpectedly found that this is a key determinant in the ability to control translation of the lens on the eye in order to alternate from far to near vision. Attempts to improve translation control by changing the base curve radius in order to tighten or loosen the lens were not successful. It was surprising to find that the larger diameter was so critical, especially since the larger diameter produces a tighter fitting lens which would have been expected to more or less immobilize movement of the lens. When, for example, a 13.5 mm diameter lens was tried with optimal fitting, good translation control was not obtained on a much larger percentage of patients than with a 14.5 mm diameter lens.

Another advantage of the critical set of dimensions, and particularly the diameter, is that the lens can be made thinner without loss of translation control. Thus, for example, a 13.5 mm diameter lens having center thicknesses as low as those shown in Table I, gave uncontrolled lens translation, in many persons even when the lens was otherwise optimally fitted.

BRIEF DESCRIPTION OF THE DRAWINGS

FIG. 1 represents a frontal projection of the lens onto a plane, i.e., an orthographic projection. All dimensions shown in FIG. 1 are measured in the plane of the frontal projection. All dimensions shown in the drawings and described in the specification and claims are achieved after the hydrophilic lens is hydrated.

DETAILED DESCRIPTION OF THE INVENTION

Figure 1:
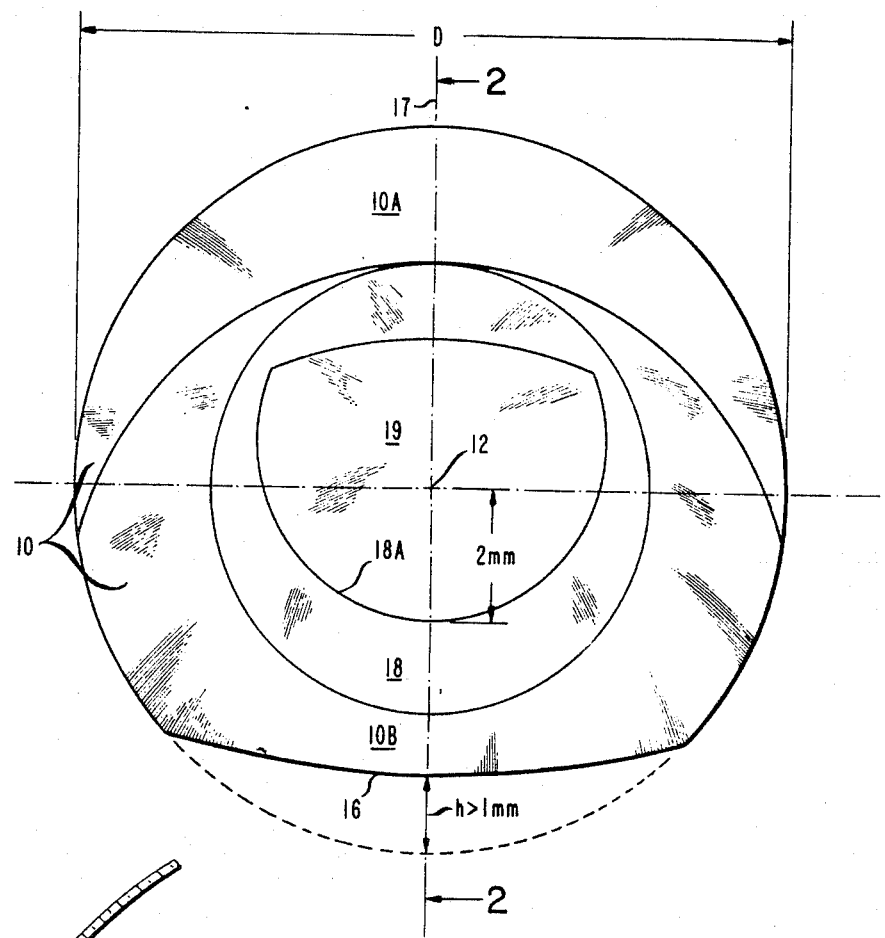
FIG. 1 is a front view of a hydrophilic bifocal corneal lens in accordance with the invention.
Figure 2:
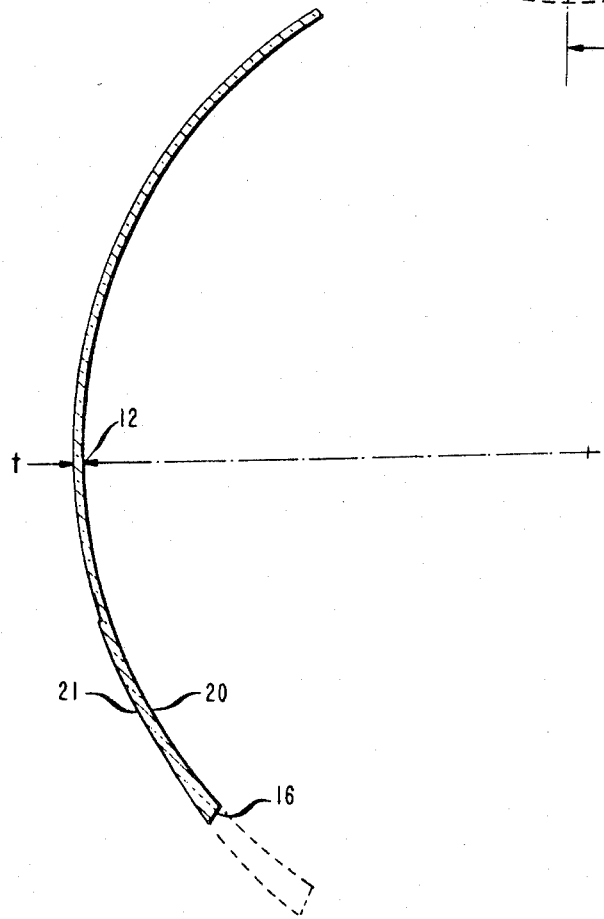
FIG. 2 is a sectional view of the lens of FIG. 1 taken along section 2—2.

FIGS. 1 and 2 show the preferred embodiment of the inventive bifocal contact lens. The inventive lens, which is constructed of hydrophilic material, has a concave rear surface 20 intended to contact the patients eye and a generally convex front surface 21. In frontal projection (FIG. 1) the lens has a perimeter in the form of a truncated circle, i.e. a circle from which a portion has been cut away. In FIG. 1 the dotted line at the bottom represents the portion of the original, untruncated circle cut away. As used throughout the specification and claims, the center of the truncated circle is the same as the center of the circle before truncation. The truncated circle has a diamter D between 14 and 15 mm, preferably 14.5 mm. Any diameter passing through center 12 of the truncated circle will have diameter D of from 14 to 15 mm, unless the diameter passes through the truncation 16, in which case the diameter will be less than D.

Truncation 16 forms the bottom of the lens and has a height h of greater than 1 mm, preferably at least 1.25 mm, and most preferably 1.5 mm. The height h of the truncation is the distance from the outer perimeter of the untruncated circle, shown dotted in FIG. 1 to the bottom of the lens measured along a line 17 vertically bisecting the lens. Preferably the truncation is slightly curved, as shown in FIG. 1, but a straight truncation is acceptable as long as the height of the truncation, i.e. the distance from the edge of the original untruncated circle to the bottom mid-point of the lens is at least 1 mm.

A reading segment 18 is located above the truncation. Reading segment 18 has an upper boundary 18A located below the center 12 of the truncated circle. The distance from center 12 to upper boundary 18A measured along a line 17 bisecting the lens is from 1.5 to 3.5 mm, preferably between 2 mm and 2.5 mm, and more preferably 2 mm as shown in FIG. 1.

A distant-vision segment 19 is located such that center 12 is within distant-vision segment 19. In FIG. 1 the prescription for reading segment 18 completely surrounds distant-vision segment 19, however this is not necessarily true for all cases, depending on the prescriptions of the two segments. Of course, any part of the reading segment prescription located above the distant-vision segment would not be used. Hence 18A, located below center 12, is the upper boundary of the usable reading segment.

It is generally desirable to maintain the thickness of the lens as low as possible. The thinner the lens, the greater the transmittance of oxygen from the environment through the lens to the corneal surface. However, with lenses not having the critical dimensions of the invention, it was not practical to make the lenses thin because thinness caused the lenses to move excessively. We have found that by making lenses in accordance with the invention, it is possible to make the lenses thinner and still provide a lens in which the movement is well controlled.

Table I illustrates preferred maximum thickness t of the inventive lens for adds in the power range of 1.25 to 2.50 diopters. Of course, for other prescriptions, correspondingly thin maximum center thicknesses would be used.

TABLE I

Preferred Maximum Center Thickness

| Distant-vision Prescription, Diopters | Add to distant vision prescriptions to achieve reading prescription, diopters | Maximum Thickness t at Center, mm |
|---|---|---|
| −4 | 1.25 | 0.08 |
| −2 | 1.25 | 0.08 |
| 0 | 1.25 | 0.08 |
| +2 | 1.25 | 0.14 |
| −4 | 2.50 | 0.08 |
| −2 | 2.50 | 0.08 |
| 0 | 2.50 | 0.10 |
| +2 | 2.50 | 0.15 |
| +6 | 2.50 | 0.24 |

The inventive lens has an optional outer carrier 10 having a thin upper portion 10A and a thicker lower portion 10B. Extra thickness at the bottom helps to prevent rotation of the lens within the eye.

Bifocal lenses of the present invention may be made from any of the hydrophilic polymers useful for making soft contact lenses, such as polymers made by polymerizing hydroxyethyl methacrylate, vinyl pyrrolidone, and other hydrophilic monomers in the presence of suitable initiators and optional cross-linking agents. A particularly useful hydrophilic polymer for making lenses in accordance with the present invention contains a major amount of hydroxyethyl methacrylate and a minor amount of ethoxyethyl methacrylate and is described in U.S. Pat. No. 4,028,295. Minor amounts of methacrylic acid added to the mixture of monomers disclosed therein also provide a useful polymer. Lenses in accordance with the invention may be made by cutting the polymer in its unhydrated state in a manner well known in the art. For example, the lenses may be based on the "no jump" principle described by Mandell in the Optometric Weekly, June 1, 1967, pages 19 to 21.

EXAMPLE 1

Several patients are fitted with lenses in accordance with the present invention having the following dimensions:
Diameter D: 14.5 mm
Distance from center of lens to top of reading segment along a line bisecting the lens: 1.5 mm
Height of truncation, h: 1 mm
Inner diameter of carrier: 9 mm Fitters report that the lens centers more readily and rotates less than alternating-vision soft bifocals of the prior art. Patients report that the lenses of this example are more comfortable and cause less tearing than the prior-art alternating-vision bifocal.

EXAMPLE 2

Several patients are fitted with lenses in accordance with the present invention having the following dimensions:
Diameter D: 14.5 mm
Distance from center of lens to top or reading segment along a line bisecting lens: 2.5 mm
Truncation height: 1.5 mm
Inner Diameter of carrier: 9 mm
Thickness t of lens: In accordance with Table I.

Two studies were performed with the following results:

|  | Study #1 | Study #2 |
|---|---|---|
| Percent of patients having at least 75% of the pupil in the distant-vision segment when looking straight ahead: | 84% | 96% |
| Percentage of patients having 100% of the pupil in the distant-vision segment when looking straight ahead: | 72% | 72% |

These results project a high long-term success rate for patients fitted with the inventive lenses.

What is claimed is:

1. A hydrophilic bifocal corneal contact lens comprising a concave rear surface and a convex front surface, said lens in frontal projection comprising:
   (a) a perimeter in the form of a truncated circle having a diameter of 14.5 mm, said truncation forming the bottom of said lens and having a height of about 1.5 mm,
   (b) a reading segment above the truncation having an upper boundary below the center of said truncated circle, the distance from said center to said upper boundary along a line bisecting the lens being from 1.5 to 3.5 mm, and (c) a distant-vision segment located such that the center of said truncated circle is within said distant-vision segment;

wherein the prescriptions and maximum thickness at the center of such truncated circle are as follows:

| Distant-Vision Prescription, Diopters | Add to Distant Vision Prescriptions to Achieve Reading Prescription, Diopters | Maximum Thickness t At Center, mm |
|---|---|---|
| −4 | 1.25 | 0.08 |
| −2 | 1.25 | 0.08 |
| 0 | 1.25 | 0.08 |
| +2 | 1.25 | 0.14 |
| −4 | 2.50 | 0.08 |
| −2 | 2.50 | 0.08 |
| 0 | 2.50 | 0.10 |
| +2 | 2.50 | 0.15 |
| +6 | 2.50 | 0.24 | whereby when said lens is worn by a patient the distant-vision segment covers at least 70 percent of the patient's pupil when the patient looks straight ahead.

2. A hydrophilic bifocal corneal contact lens comprising a concave rear surface and a convex front surface, said lens in frontal projection comprising:

(a) a perimeter in the form of a truncated circle having a diameter of 14.5 mm, said truncation forming the bottom of said lens and having a height greater than 1 mm, (b) a reading segment above the truncation having an upper boundary below the center of said truncated circle, the distance from said center to said upper boundary along a line bisecting the lens being 2 mm, and (c) a distant-vision segment located such that the center of said truncated circle is within said distant-vision segment;

wherein the prescriptions and maximum thickness at the center of such truncated circle are as follows:

| Distant-Vision Prescription, Diopters | Add to Distant Vision Prescriptions to Achieve Reading Prescription, Diopters | Maximum Thickness t At Center, mm |
|---|---|---|
| −4 | 1.25 | 0.08 |
| −2 | 1.25 | 0.08 |
| 0 | 1.25 | 0.08 |
| +2 | 1.25 | 0.14 |
| −4 | 2.50 | 0.08 |
| −2 | 2.50 | 0.08 |
| 0 | 2.50 | 0.10 |
| +2 | 2.50 | 0.15 |
| +6 | 2.50 | 0.24 | whereby when said lens is worn by a patient the distant-vision segment covers at least 70 percent of the patient's pupil when the patient looks straight ahead.

3. A hydrophilic bifocal corneal contact lens comprising a concave rear surface and a convex front surface, said lens in frontal projection comprising:

(a) a perimeter in the form of a truncated circle having a diameter of 14 to 15 mm, said truncation forming the bottom of said lens and having a height of 1.5 mm, (b) a reading segment above the truncation having an upper boundary below the center of said truncated circle, the distance from said center to said upper boundary along a line bisecting the lens being 2 mm, and (c) a distant-vision segment located such that the center of said truncated circle is within said distant-vision segment;

wherein the prescriptions and maximum thickness at the center of such truncated circle are as follows:

| Distant-Vision Prescription, Diopters | Add to Distant Vision Prescriptions to Achieve Reading Prescription, Diopters | Maximum Thickness t At Center, mm |
|---|---|---|
| −4 | 1.25 | 0.08 |
| −2 | 1.25 | 0.08 |
| 0 | 1.25 | 0.08 |
| +2 | 1.25 | 0.14 |
| −4 | 2.50 | 0.08 |
| −2 | 2.50 | 0.08 |
| 0 | 2.50 | 0.10 |
| +2 | 2.50 | 0.15 |
| +6 | 2.50 | 0.24 | whereby when said lens is worn by a patient the distant-vision segment covers at least 70 percent of the patient's pupil when the patient looks straight ahead.

* * * * *